United States Patent
Kanevsky

(10) Patent No.: US 10,554,529 B2
(45) Date of Patent: *Feb. 4, 2020

(54) LOW-IMPACT PROACTIVE MONITORING OF CUSTOMER ACCESS TO VIRTUALIZED NETWORK ELEMENTS IN A CLOUD PLATFORM

(71) Applicant: AT&T Intellectual Property I, L.P., Atlanta, GA (US)

(72) Inventor: Zosim Kanevsky, Wayne, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/934,109

(22) Filed: Mar. 23, 2018

(65) Prior Publication Data

US 2018/0212855 A1  Jul. 26, 2018

Related U.S. Application Data

(63) Continuation of application No. 14/847,600, filed on Sep. 8, 2015, now Pat. No. 9,935,862.

(51) Int. Cl.
*G06F 15/173* (2006.01)
*H04L 12/26* (2006.01)
*H04L 29/12* (2006.01)
*H04L 29/08* (2006.01)

(52) U.S. Cl.
CPC .......... *H04L 43/10* (2013.01); *H04L 61/103* (2013.01); *H04L 61/6009* (2013.01); *H04L 61/6022* (2013.01); *H04L 67/10* (2013.01)

(58) Field of Classification Search
CPC ...... H04L 43/10; H04L 45/02; G06F 9/45558
See application file for complete search history.

(56) References Cited

U.S. PATENT DOCUMENTS 8,046,456 B1  10/2011  Miller et al.
8,370,488 B1   2/2013  Miller et al.
8,660,129 B1   2/2014  Brendel et al.
(Continued)

OTHER PUBLICATIONS

Kondwilkar et al., "Can an SDN-based Network Management System use northbound Rest APIs to communicate network changes to the application layer?", Apr. 25, 2015.
(Continued)

*Primary Examiner* — Dustin Nguyen
(74) *Attorney, Agent, or Firm* — Hartman & Citrin LLC

(57) ABSTRACT

A system can collect, from an address resolution protocol ("ARP") cache of a managed virtual network function ("VNF"), at least one active entry corresponding to at least one active element of a plurality of virtual local area network ("VLAN") networks. The system can check the ARP cache for an entry associated with at least one of the plurality of VLAN elements. The system can determine whether an entry associated with at least one of the plurality of VLAN elements was found. In response to determining that an entry associated with at least one of the plurality of VLAN elements was not found, the system can send an ARP request to the plurality of VLAN elements, wait for an ARP response, and, in response to determining that an ARP response has not been received, generate a notification that VLAN connectivity has been lost.

20 Claims, 6 Drawing Sheets

(56) References Cited

U.S. PATENT DOCUMENTS

| | | |
|---|---|---|
| 8,805,382 B2 | 8/2014 | Rahman et al. |
| 8,958,293 B1 | 2/2015 | Anderson |
| 9,014,013 B2 | 4/2015 | Durrani et al. |
| 2005/0262235 A1 | 11/2005 | Childress |
| 2006/0233179 A1 | 10/2006 | Estrada |
| 2008/0101381 A1 | 5/2008 | Sun |
| 2010/0027551 A1 | 2/2010 | Arkin |
| 2010/0172293 A1 | 7/2010 | Toth |
| 2013/0010642 A1 | 1/2013 | Ullas |
| 2013/0246502 A1 | 9/2013 | Thorvaldsen |
| 2013/0311663 A1 | 11/2013 | Kamath et al. |
| 2014/0195666 A1 | 7/2014 | Dumitriu |
| 2014/0301391 A1 | 10/2014 | Krishnan et al. |
| 2015/0143368 A1* | 5/2015 | Bugenhagen ....... G06F 9/45558 718/1 |
| 2016/0006642 A1* | 1/2016 | Chang ................... H04L 45/02 370/252 |

OTHER PUBLICATIONS

U.S. Office Action dated Jul. 26, 2017 in U.S. Appl. No. 14/847,600.
U.S. Notice of Allowance dated Nov. 16, 2017 in U.S. Appl. No. 14/847,600.

* cited by examiner

LOW-IMPACT PROACTIVE MONITORING OF CUSTOMER ACCESS TO VIRTUALIZED NETWORK ELEMENTS IN A CLOUD PLATFORM

CROSS-REFERENCE TO RELATED APPLICATIONS

This application is a continuation of U.S. patent application Ser. No. 14/847,600, entitled "Low-Impact Proactive Monitoring of Customer Access to Virtualized Network Elements in a Cloud Platform," filed Sep. 8, 2015, now U.S. Pat. No. 9,935,862, which is incorporated herein by reference in its entirety.

BACKGROUND

Software-defined networking ("SDN") is an architectural framework for creating intelligent networks that are programmable, application aware, and more open. SDN provides an agile and cost-effective communications platform for handling the dramatic increase in data traffic on networks by providing a high degree of scalability, security, and flexibility. SDN provides several benefits. SDN can allow for the creation of multiple virtual network control planes on common hardware. SDN can help extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as Open-Flow, available from Open Network Forum ("ONF").

Customer-defined, on-demand cloud services and user digital experience expectations are driving planning and deployment of network function virtualization and service-centric SDN among global telecommunications service providers. Network Virtualization Platforms ("NVPs"), including some cloud platforms, are deployed in information technology ("IT") data centers and network central offices to accelerate deployment of on-demand user service and virtualized network functions ("VNFs"). A NVP is a shared virtualized infrastructure that supports multiple services and network applications (including real-time and non-real-time applications).

In today's managed services, a fault management system ("FMS") manages routers, servers, switches, and/or other network elements that are located on the customer's premises. In emerging solutions, the managed router or managed Internet service connections are implemented using virtualized network elements located in a cloud platform. These virtualized network elements are also referred to as managed VNFs. The customers may access managed VNFs via data link layer (Layer 2) Ethernet. The network elements on the customer's end of the connection and the VNF will then belong to the same virtual local area network ("VLAN"). With managed services as defined today, the elements at the customer's end of this connection will not be managed. Therefore, existing FMSs will not be able to proactively identify loss of connectivity between customer end of the access connection and the managed VNF in a cloud platform.

Tools exist that allow intrusive diagnostics of data link layer connectivity loss, but the intrusive nature of these tools render them unsuitable for proactive monitoring. Alternatively, it is possible to change the definition of a service, to request that the customer set up an active IP address known to and accessible by the FMS, and to make the FMS ping the active IP address with a configured interval, similar to what is done in managed services today. This solution changes definition of the service and also limits customer's control of their internal network, and therefore might be not acceptable to the customer for security reasons.

SUMMARY

Concepts and technologies disclosed herein are directed to low-impact proactive monitoring of customer access to virtualized network elements in a cloud platform. According to one aspect of the concepts and technologies disclosed herein, a system can include an interface to a managed virtual network function ("VNF"). The managed VNF is part of a virtual local area network ("VLAN") with a plurality of VLAN elements of a customer premises portion of the VLAN. The system can include a processor and a memory that stores instructions of a managing agent that, when executed by the processor, cause the processor to perform operations. The system can periodically collect, via the interface, from an address resolution protocol ("ARP") cache of the managed VNF, at least one active entry corresponding to at least one active element of the plurality of VLAN elements of the customer premises portion of the VLAN. The system can periodically check, via the interface, the ARP cache for an entry associated with at least one of the plurality of VLAN elements. The system can determine whether an entry associated with at least one of the plurality of VLAN elements was found. In response to determining that an entry associated with at least one of the plurality of VLAN elements was not found, the system can generate an ARP request and can send the ARP request to the plurality of VLAN elements of the customer premises portion of the VLAN. The system can wait for an ARP response from at least one of the plurality of VLAN elements. The system can determine whether an ARP response has been received. In response to determining that an ARP response has not been received, the system can generate a notification that VLAN connectivity has been lost.

In some embodiments, the interface can include a command line interface. In some other embodiments, the interface can include an IP management information base ("MIB"). In some other embodiments, the interface can include a proprietary MIB.

In some embodiments, the system can configure a time interval for periodically collecting, from the ARP cache of the managed VNF, the at least one active entry corresponding to the at least one active element of the plurality of VLAN elements of the customer premises portion of the VLAN.

In some embodiments, the notification can include a network configuration protocol ("NETCONF") notification. In some other embodiments, the notification can include a simple network management protocol ("SNMP") notification.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
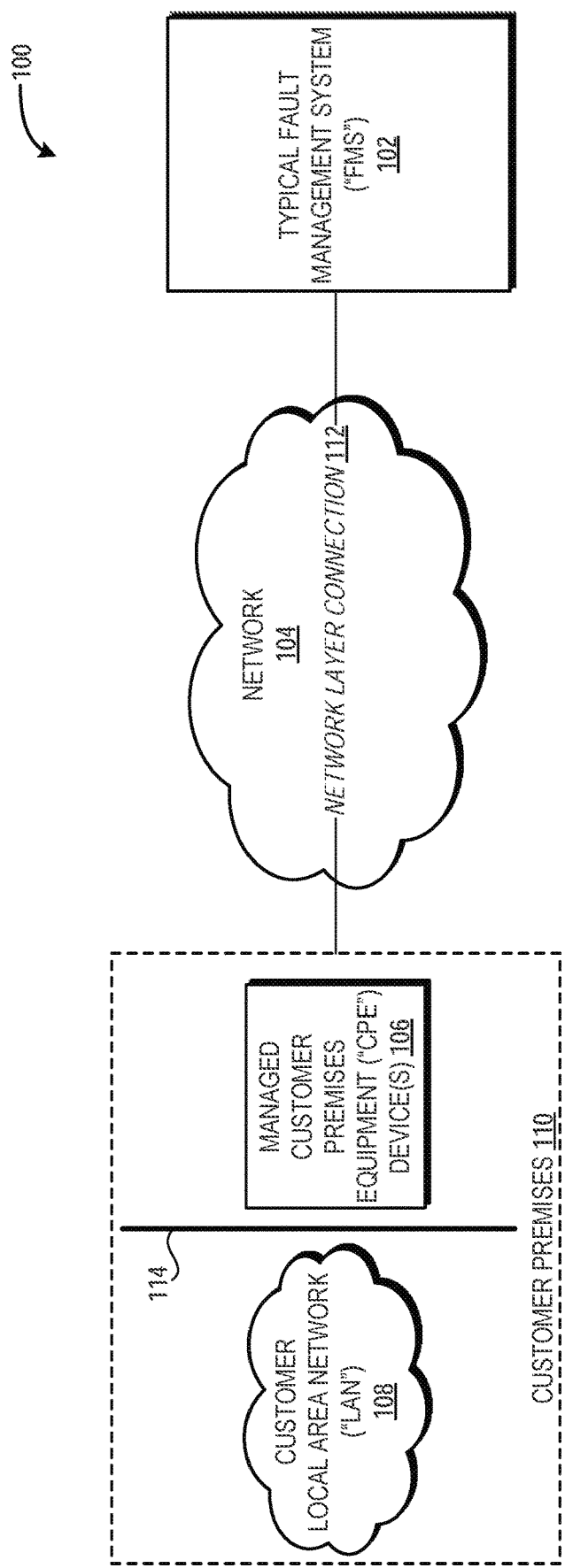
FIG. 1 is a block diagram illustrating aspects of a typical managed service solution.

The concepts and technologies disclosed herein are directed to low-impact proactive monitoring of customer access to virtualized network elements in a cloud platform. More particularly, the concepts and technologies disclosed herein use address resolution protocol ("ARP") for low-impact, agentless monitoring of end-to-end connectivity between one or more customer network elements (e.g., routers, switches, servers, and the like) of a customer premises and a cloud platform-residing managed virtual network function ("VNF"). The managed VNF and the customer network element(s) on the customer's end of the connection belong to the same virtual local area network ("VLAN") and therefore always support ARP without any need for additional software or special access permissions. The concepts and technologies disclosed herein are agentless because there is no requirement for the installation of any software or making any configuration changes on the network element(s) located at the customer premises portion of the VLAN. The concepts and technologies disclosed herein are low-impact because no network management traffic is generated through the VLAN connection as long as the VLAN connection carries payload traffic.

The concepts and technologies disclosed herein leverage several features of ARP. All VLAN elements, including the managed VNF, can maintain and update an ARP cache of IP-address-to-MAC-address relationships (also referred to herein as an "ARP table"). The managed VNF can maintain such a cache for the network element(s) located at the customer premises portion of the VLAN. The ARP cache on the managed VNF can be purged and refreshed in configurable intervals. The interval can be configured on the VNF independently of any configurable interval on the customer network element(s) located at the customer premises portion of the VLAN. The ARP cache on the managed VNF also can be purged and refreshed in response to a command. The ARP cache can rebuild automatically when payload traffic between VLAN elements continues. An ARP request to any of the known network element(s) located at the customer premises portion of the VLAN can be initiated by a command on the VNF.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

While connections are shown between some of the components illustrated in FIG. 1, it should be understood that some, none, or all of the components illustrated in FIG. 1 can be configured to interact with one other to carry out various functions described herein. Thus, it should be understood that FIG. 1 and the following description are intended to provide a general understanding of a suitable environment in which various aspects of embodiments can be implemented, and should not be construed as being limiting in any way.

Referring now to FIG. 1, aspects of a typical managed service solution 100 provided by a service provider will be described. The service provider can provide any managed service or combination of services. The service(s) can be, for example, IP telecommunications services, domain name service ("DNS"), remote authentication dial-in user service ("RADIUS"), dynamic host configuration protocol ("DHCP"), lightweight directory access protocol ("LDAP"), content routing in either or both of the control and data planes, and route reflecting in either or both the control and data planes. The services also can include, for example, one or more real-time services such as, but are not limited to, voice over internet protocol ("VoIP") service, streaming video service, videoconferencing service, online gaming service, chatting service, instant messaging ("IM") service, and the like in the service plane. The service(s) can be provided to one or more customers such as individuals, groups of individuals, businesses or specific portions thereof, and the like.

The typical managed service solution 100 shown in FIG. 1 includes a typical fault management system ("FMS") 102 operating on or in communication with a network 104. The typical FMS 102 can monitor one or more managed customer premises equipment ("CPE") devices 106 operating on or in communication with a customer LAN 108 located on a customer premises 110. The typical FMS 102 can perform fault management operations for the managed CPE devices 106. These operations can include fault detection, root cause identification, fault resolution to return service provided to pre-fault conditions, and other operations to manage the managed CPE devices 106.

The managed CPE device(s) 106 can be or can include any equipment, connections, and the like located at the customer premises 110 and connected to the network 104 via one or more telecommunication channel(s) provided by a network layer connection 112 at a demarcation line for FMS access 114. In particular, the managed CPE device(s) 106 can be or can include one or more customer edge ("CE") routers, one or more servers, one or more switches, one or more telephones, one or more modems, one or more set-top boxes, one or more phone systems, one or more private branch exchanges ("PBXs"), other network elements, combinations thereof, and the like operating on or in communication with the customer LAN 108. The demarcation line for FMS access 114 separates the managed CPE device(s) 106 from equipment of the network service provider, including, for example, servers, switches, routers, the typical FMS 102, and/or other network elements operating on or in communication with the network 104 to provide, at least in part, one or more services to one or more customers. The network 104 can be or can include one or more networks, such as, for example, one or more access networks, one or more core networks, one or more backbone networks, or combinations thereof to facilitate communications between the managed CPE devices 106 and network elements that provide the service(s) to one or more customers associated with the customer premises.

Figure 2:
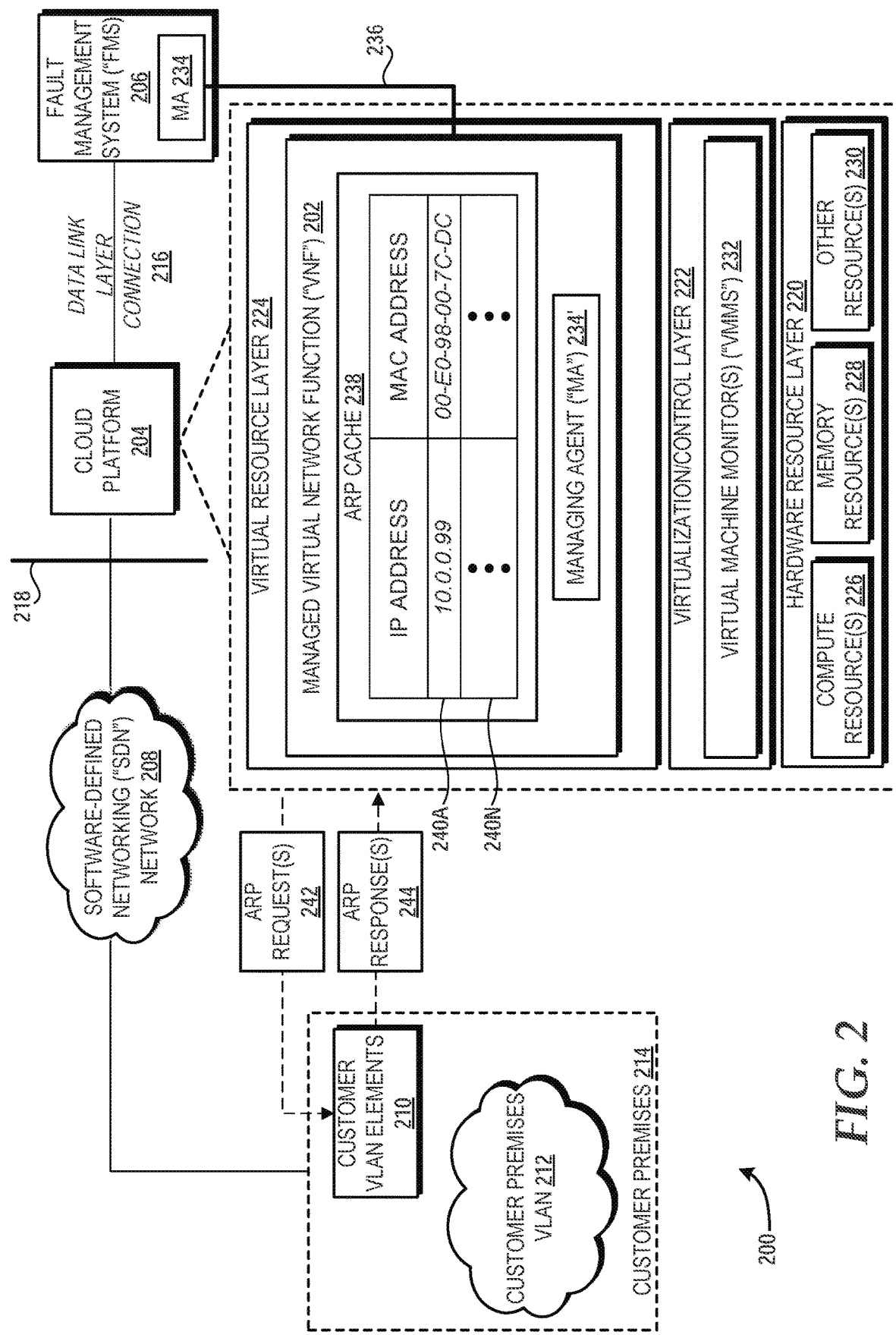
FIG. 2 is a block diagram illustrating aspects of a managed service solution implemented with a virtual network function ("VNF") in a cloud platform, according to an illustrative embodiment.

Turning now to FIG. 2, aspects of a managed service solution 200 provided by a service provider by implementing a managed VNF 202 operating on a cloud platform 204 will be described, according to an illustrative embodiment of the concepts and technologies disclosed herein. The service provider can provide any managed service or combination of services, such as, for example, IP telecommunications services, DNS, RADIUS, DHCP, LDAP, content routing in either or both of the control and data planes, and route reflecting in either or both the control and data planes. The services also can include, for example, one or more real-time services such as, but are not limited to, VoIP service, streaming video service, videoconferencing service, online gaming service, chatting service, IM service, and the like in the service plane. The service(s) can be provided to one or more customers such as individuals, groups of individuals, businesses or specific portions thereof, and the like.

The managed service solution 200 shown in FIG. 2 includes an FMS 206 operating on or in communication with the cloud platform 204, which, in turn, is operating on or in communication with an SDN network 208 to monitor one or more customer VLAN elements 210 operating on or in communication with a customer premises portion of a VLAN ("customer premises VLAN 212") located on a customer premises 214. One or more customers can access the managed VNF 202 operating on the cloud platform 204, using the customer VLAN element(s) 210, via a data link layer connection (e.g., Ethernet) 216. The customer VLAN elements 210 on the customer's end of the data link layer connection 216 and the managed VNF 202 belong to the same VLAN.

The FMS 206 can monitor the customer VLAN elements 210 operating on or in communication with the customer premises VLAN 212. The FMS 206 can perform fault management operations for the customer VLAN elements 210. These operations can include fault detection, root cause identification, fault resolution to return service provided to pre-fault conditions, and other operations to manage the customer VLAN elements 210.

The customer VLAN elements 210 can be or can include any equipment, connections, and the like located at the customer premises 214 and connected to the SDN network 208 via one or more telecommunication channel(s) provided by the data link layer connection 216 at a demarcation line for FMS access 218. In particular, the customer VLAN elements 210 can be or can include one or more CE routers, one or more servers, one or more switches, one or more telephones, one or more modems, one or more set-top boxes, one or more phone systems, one or more PBXs, other network elements, combinations thereof, and the like operating on or in communication with the customer premises VLAN 212. The demarcation line for FMS access 218 separates the customer VLAN elements 210 from equipment of the network service provider, including, for example, servers, switches, routers, the FMS 206, and/or other network elements operating on or in communication with the cloud platform 204 and/or the SDN network 208 to provide, at least in part, one or more services to one or more customers.

The SDN network 208 can be or can include one or more SDN access networks, one or more SDN core networks, one or more SDN backbone networks, or combinations thereof to facilitate communications between the customer VLAN elements 210 and network elements that provide the service(s) to one or more customers associated with the customer premises 214. The SDN network 208 can be programmable, application aware, and open to provide an agile and cost-effective communications platform for handling network traffic between the customer VLAN elements 210 and the cloud platform 204. The SDN network 208 provides a high degree of scalability, security, and flexibility. The SDN network 208, or at least a portion thereof, can be created and managed by the cloud platform 204.

The cloud platform 204 is a shared infrastructure that can support multiple services such as, for example, IP telecommunications services, DNS, RADIUS, DHCP, LDAP, content routing in either or both of the control and data planes, and route reflecting in either or both the control and data planes. The services also can include, for example, one or more real-time services such as, but not limited to, VoIP service, streaming video service, videoconferencing service, online gaming service, chatting service, IM service, and the like in the service plane. The service(s) can be provided to one or more customers such as individuals, groups of individuals, businesses or specific portions thereof, and the like.

The illustrated cloud platform 204 includes a hardware resource layer 220, a virtualization/control layer 222, and a virtual resource layer 224 that work together to perform operations as will be described in detail herein. The hardware resource layer 220 provides hardware resources, which, in the illustrated embodiment, include one or more compute resources 226, one or more memory resources 228, and one or more other resources 230.

The compute resource(s) 226 can include one or more hardware components that perform computations to process data, and/or to execute computer-executable instructions of one or more application programs, operating systems, and/or other software. The compute resources 226 can include one or more central processing units ("CPUs") configured with one or more processing cores. The compute resources 226 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 226 can include one or more discrete GPUs. In some other embodiments, the compute resources 226 can include CPU and GPU components that are configured in accordance with a co-processing CPU/GPU computing model, wherein the sequential part of an application executes on the CPU and the computationally-intensive part is accelerated by the GPU. The compute resources 226 can include one or more system-on-chip ("SoC") components along with one or more other components, including, for example, one or more of the memory resources 228, and/or one or more of the other resources 230. In some embodiments, the compute resources 226 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 226 can be or can include one or more hardware components architected in accordance with an ARM architecture, available for license from ARM HOLDINGS of Cambridge, United Kingdom. Alternatively, the compute resources 226 can be or can include one or more hardware components architected in accordance with an x86 architecture, such an architecture available from INTEL CORPORATION of Mountain View, Calif., and others. Those skilled in the art will appreciate the implementation of the compute resources 226 can utilize various computation architectures or combinations thereof, and as such, the compute resources 226 should not be construed as being limited to any particular computation architecture or combination of computation architectures, including those explicitly disclosed herein.

The memory resource(s) 228 can include one or more hardware components that perform storage operations, including temporary or permanent storage operations. In some embodiments, the memory resource(s) 228 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 226.

The other resource(s) 230 can include any other hardware resources that can be utilized by the compute resources(s) 226 and/or the memory resource(s) 228 to perform operations described herein. The other resource(s) 230 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 220 can be virtualized by one or more virtual machine monitors ("VMMs") 232 (also known as "hypervisors"; hereinafter "VMMs 232") operating within the virtualization/control layer 222 to manage one or more virtual resources that reside in the virtual resource layer 224, including the managed VNF 202. The VMMs 232 can be or can include software, firmware, and/or hardware that alone or in combination with other software, firmware, and/or hardware, manages one or more virtual resources operating within the virtual resource layer 224.

The virtual resources operating within the virtual resource layer 224 can include abstractions of at least a portion of the compute resources 226, the memory resources 228, the other resources 230, or any combination thereof. These abstractions are referred to herein as virtual machines (not shown) that can execute one or more VNFs. In the illustrated embodiment, the virtual resource layer 224 includes the managed VNF 202. The managed VNF 202 can be or can include one or more applications that support networking operations to provide, at least in part, one or more services to one or more customers associated with the customer premises 214.

The managed service solution 200 uses ARP for low-impact, agentless monitoring of end-to-end connectivity between the customer premises 214 and the managed VNF 202. The managed VNF 202 and the customer VLAN elements 210 operating on the customer premises VLAN 212 of the customer premises 214 belong to the same VLAN and therefore support ARP without any additional software and/or special access permission. The managed service solution 200 is agentless because it does not require installing any software or making any configuration changes on the customer VLAN elements 210. The managed service solution 200 is low-impact because no network management traffic is generated through the VLAN connection as long as it carries some payload traffic.

The managed service solution 200 also includes a managing agent ("MA") 234, 234'. In some embodiments, the MA 234 can be executed by the FMS 206. In these embodiments, the MA 234 can communicate with the managed VNF 202 via an interface 236. The interface 236 can include command-line interface ("CLI"), the network configuration protocol ("NETCONF"), or like interface. In some other embodiments, the MA 234' can be executed by the managed VNF 202.

The managed VNF 202 can maintain and update an ARP cache 238. The ARP cache 238 can include a table containing matched sets of IP addresses and hardware (e.g., MAC) addresses in ARP cache entries 240A-240N. The ARP cache entries 240A-240N can be created dynamically when a hostname is resolved to an IP address and then the IP address is resolved to a MAC address. The MA 234, 234' can add the matched sets of IP addresses and hardware addresses to the ARP cache 238 upon completion of ARP resolutions with the customer VLAN elements 210 located at the customer premises VLAN 212. The ARP cache 238 on the managed VNF 202 can be purged and refreshed in configurable intervals. The interval can be configured on the managed VNF 202 independently of any configurable interval on the customer VLAN elements 210 located at the customer premises VLAN 212. The ARP cache 238 on the managed VNF 202 also can be purged and refreshed in response to a command received, for example, via the interface 236. The ARP cache 238 can rebuild automatically when payload traffic between the customer VLAN elements 210 and the managed VNF 202 continues. One or more ARP requests 242 to any known network element(s) of the customer VLAN elements 210 located at the customer premises 214 can be initiated by a command on the managed VNF 202. If at least one of the ARP requests 242 succeeds with at least one of the customer VLAN elements 210, the successful element(s) can return, in one or more ARP responses 244 a cache entry to be added to the ARP cache 238. The unsuccessful element(s) will not return any data. The ARP requests 242 can be initiated by either the MA 234' or MA 234 (the latter is performed remotely). The ARP requests 242 effectively will be sent to the customer VLAN elements 210 by a command executed on the VNF 202.

In accordance with one embodiment disclosed herein, the MA 234, 234' can periodically collect, from the ARP cache 238, and can store internally entries for active elements of the customer VLAN elements 210 on the VLAN. This periodic collection assumes that for at least some period of time the VLAN carried some payload traffic from the customer premises VLAN 212 to the managed VNF 202. The collection can be performed, in some embodiments, using a management information base ("MIB") associated with the simple network management protocol ("SNMP"), for example IP-MIB, or a vendor proprietary MIB. In some other embodiments, the collection can be performed using a CLI command that shows the entire content of the ARP cache 238 or a NETCONF command that serves the same purpose as the CLI command. The MA 234, 234' can periodically check the ARP cache 238 for the presence of MAC and/or IP addresses associated with one or more of the customer VLAN elements 210 of the VLAN. If no entries are found in a configurable number of consecutive checks, then the MA 234, 234' can issue the ARP request(s) 242 targeting one or more of the customer VLAN elements 210 with the IP addresses and/or MAC addresses previously collected. If at least one of the ARP requests 242 succeeds—that is, at least one of the ARP responses 244 is received and a new entry is added to the ARP cache 238—the MA 234, 234' exits monitoring cycle until the next check time. The time between checks can be configured for any interval and may differ depending upon particular implementation details. If none of the ARP requests 242 succeeds, then the MA 234, 234' can send a notification (e.g., SNMP notification or NETCONF notification) about VLAN connectivity loss to the FMS 206. Additional details regarding this embodiment will be described herein below with reference to FIG. 3.

In accordance with one embodiment disclosed herein, the MA 234, 234' can periodically collect, from the ARP cache 238, and can store internally entries for active elements of the customer VLAN elements 210 on the VLAN. The MA 234, 234' can periodically collect and can store internally a counter of incoming IP packets from the VLAN. The MA 234, 234' compares a current value of the counter of incoming IP packets with a last stored value. If the counter does not change in N consecutive checks (where N is configurable), then the MA 234, 234' can issue a command that purges the ARP cache 238. The MA 234, 234' can issue the ARP request(s) 242 targeting one or more of the customer VLAN elements 210 with the IP addresses and/or MAC addresses previously collected. If at least one of the ARP requests 242 succeeds—that is, at least one of the ARP responses 244 is received and a new entry is added to the ARP cache 238, the MA 234, 234' exits monitoring cycle until the next check time. The time between checks can be configured for any interval and may differ depending upon particular implementation details. If none of the ARP requests 242 succeeds, then the MA 234, 234' can send a notification (e.g., SNMP notification or NETCONF notification) about VLAN connectivity loss to the FMS 206. Additional details regarding this embodiment will be described herein below with reference to FIGS. 4A-4B.

FIG. 2 illustrates one managed VNF 202, one cloud platform 204, one FMS 206, one SDN network 208, one customer premises VLAN 212, one customer premises 214, one data link layer connection 216, one hardware resource layer 220, one virtualization/control layer 222, one virtual resource layer 224, one MA 234 in the FMS 206, one MA 234' in the managed VNF 202, one interface 236, and one ARP cache 238. It should be understood, however, that some implementations of the managed service solution 200 can include multiple managed VNFs 202, multiple cloud platforms 204, multiple FMSs 206, multiple SDN networks 208, multiple customer premises VLANs 212, multiple customer premises 214, multiple data link layer connections 216, multiple hardware resource layers 220, multiple virtualization/control layers 222, multiple virtual resource layers 224, multiple MAs 234 in the FMS 206, multiple MAs 234' in the managed VNFs 202, multiple interfaces 236, and/or multiple ARP caches 238. As such, the illustrated embodiment of the operating environment should be understood as being illustrative, and should not be construed as being limiting in any way.

Figure 3:
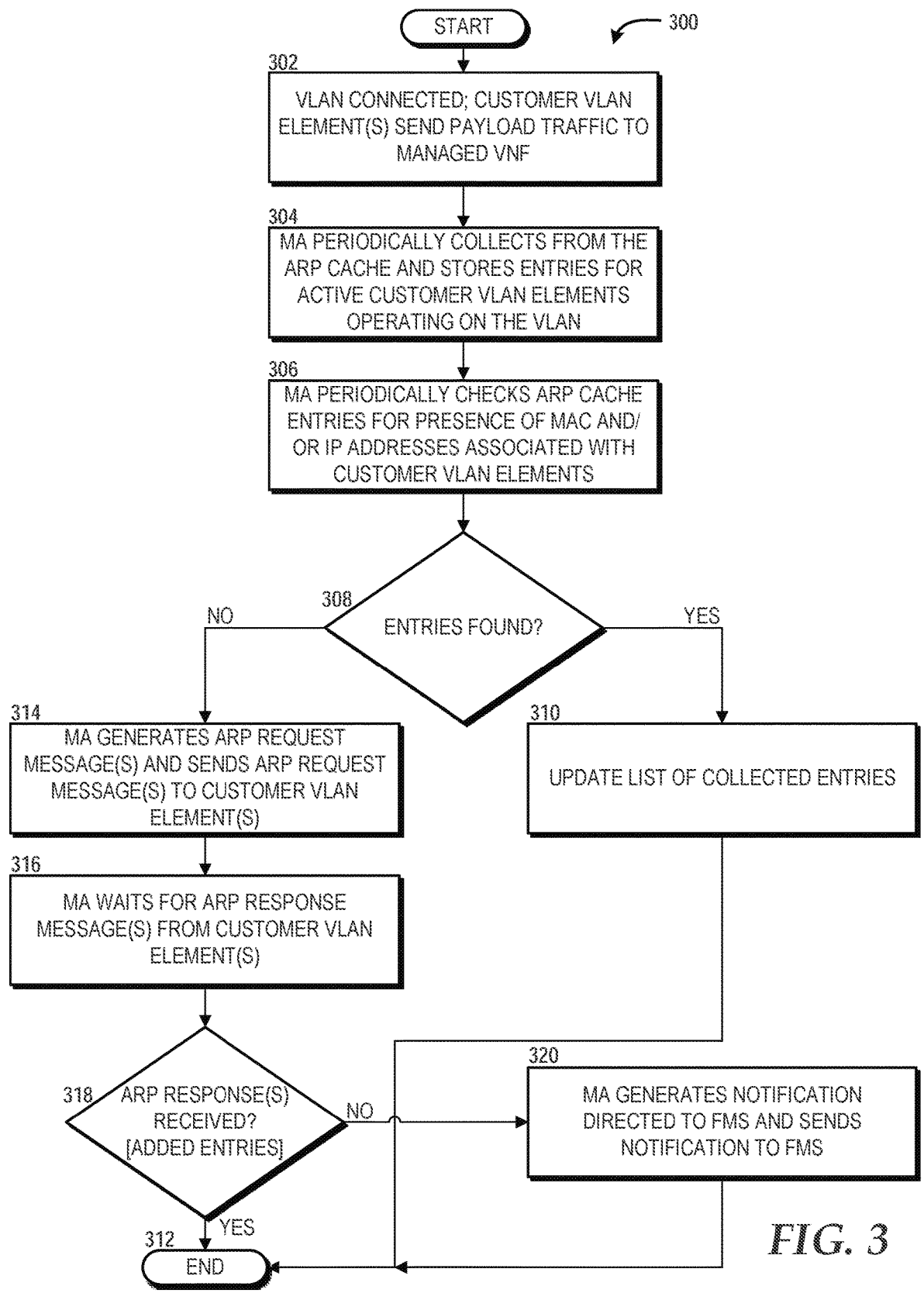
FIG. 3 is a flow diagram illustrating aspects of a method for proactively monitoring customer access to virtualized network elements in a cloud platform, according to an illustrative embodiment.

Turning now to FIG. 3, aspects of a method 300 for proactively monitoring customer access to virtualized network elements, such as the managed VNF 202 in a cloud platform, such as the cloud platform 204, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of the cloud platform 204, such as one or more of the compute resources 226, a processor of the FMS 206, and/or a processor one or more other computing systems and/or devices disclosed herein to perform operations.

For purposes of illustrating and describing some of the concepts of the present disclosure, the methods disclosed herein are described as being performed, at least in part, by the managed VNF 202 or the FMS 206 via execution of one or more software modules, which may be embodied, at least in part, by the MA 234, 234', described above with reference to FIG. 2. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIG. 2. The method 300 begins at operation 302, where the customer premises VLAN 212 and the managed VNF 202 are connected (i.e., VLAN connected) so that the customer VLAN elements 210 can carry some payload traffic to and/or receive some payload traffic from the managed VNF 202.

From operation 302, the method 300 proceeds to operation 304, where the MA 234, 234' periodically collects, from the ARP cache 238, and stores internally entries for active elements of the customer VLAN elements 210. In some embodiments, the collection can be performed using an SNMP-MIB such as IP-MIB, for example, or a proprietary MIB. In some other embodiments, the collection can be performed using CLI command that shows the entire content of the ARP cache 238. In some other embodiments, the collection can be performed using a NETCONF command that shows the entire content of the ARP cache 238.

From operation 304, the method 300 proceeds to operation 306, where the MA 234, 234' periodically checks the ARP cache 238 for the presence of MAC and/or IP address entry associated with one or more of the customer VLAN elements 210. From operation 306, the method 300 proceeds to operation 308, where the MA 234, 234' determines whether at least one entry was found. If so, the method 300 proceeds to operation 310, where the MA 234, 234' updates a list of collected entries. From operation 310, the method 300 proceeds to operation 312, where the method 300 ends. If, at operation 308, the MA 234, 234' determines that no entries are found, the method 300 proceeds to operation 314.

At operation 314, the MA 234, 234' generates one or more ARP requests, such as the ARP request(s) 242, and sends the ARP request(s) 242 to the customer VLAN elements 210. From operation 314, the method 300 proceeds to operation 316, where the MA 234, 234' waits for one or more ARP response message(s), such as the ARP response(s) 244, from one or more of the customer VLAN elements 210. From operation 316, the method 300 proceeds to operation 318, where the MA 234, 234' determines whether one or more of the ARP responses 244 have been received (i.e., entries added to the ARP cache 238). If so, the method 300 proceeds to operation 312, where the method 300 ends. If, at operation 318, the method 300 determines that one or more of the ARP responses 244 have not been received, the method 300 proceeds to operation 320, where the MA 234, 234' generates a notification directed to the FMS 206 and sends the notification to the FMS 206 to notify the FMS 206 that VLAN connectivity has been lost. From operation 320, the method 300 proceeds to operation 312, where the method 300 ends.

Figure 4A:
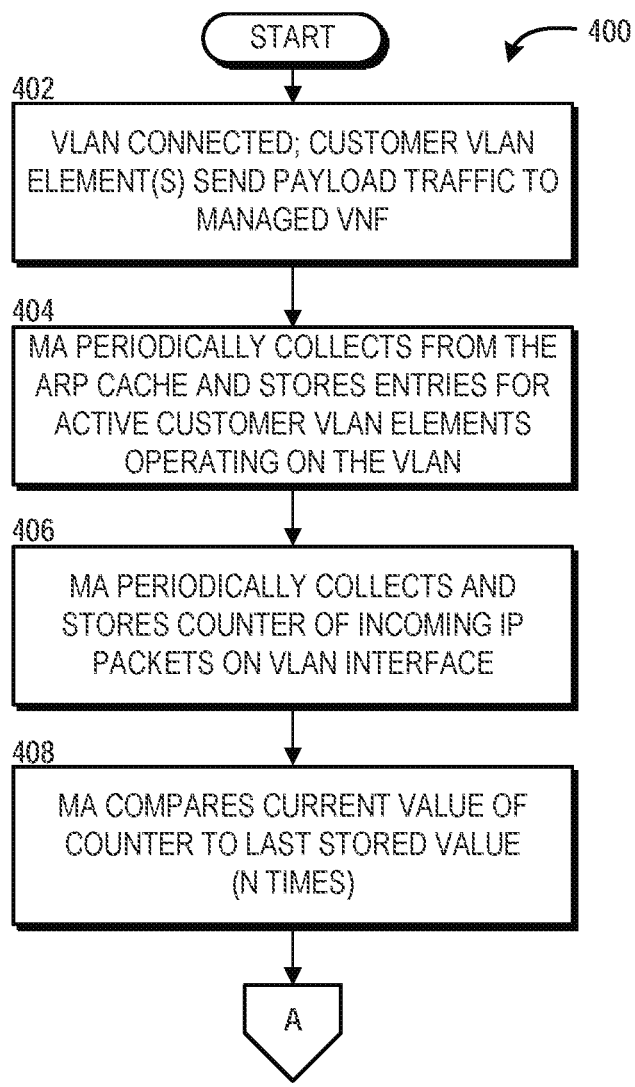
FIGS. 4A-4B are flow diagrams illustrating aspects of another method for proactively monitoring customer access to virtualized network elements in a cloud platform, according to an illustrative embodiment.
Figure 4B:
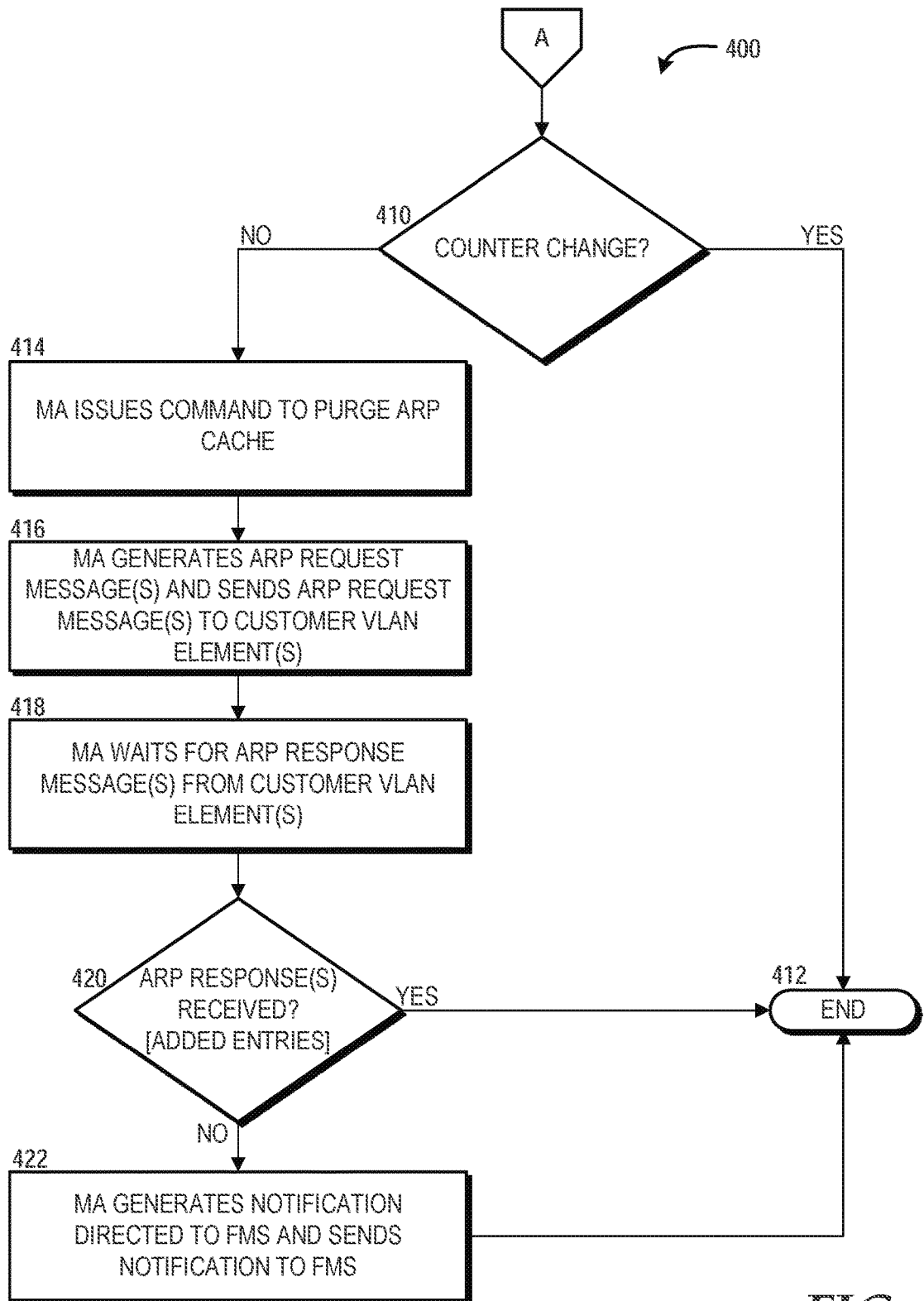

Turning now to FIGS. 4A-4B, aspects of a method 400 for proactively monitoring customer access to virtualized network elements, such as the managed VNF 202, in a cloud platform, such as the cloud platform 204, will be described, according to an illustrative embodiment. The method 400 will be described with reference to FIG. 4 and further reference to FIG. 2.

Turning first to FIG. 4A, the method 400 begins and proceeds to operation 402, where the customer premises VLAN 212 and the managed VNF 202 are connected (i.e., VLAN connected) so that the customer VLAN elements 210 can carry some payload traffic to and/or receive some payload traffic from the managed VNF 202.

From operation 402, the method 400 proceeds to operation 404, where the MA 234, 234' periodically collects, from the ARP cache 238, and stores internally entries for active elements of the customer VLAN elements 210. In some embodiments, the collection can be performed using an SNMP-MIB such as IP-MIB, for example, or a proprietary MIB. In some other embodiments, the collection can be performed using CLI command that shows the entire content of the ARP cache 238. In some other embodiments, the collection can be performed using a NETCONF command that shows the entire content of the ARP cache 238.

From operation 404, the method 400 proceeds to operation 406, where the MA 234, 234' periodically collects and stores a counter of incoming IP packets from the VLAN. From operation 406, the method 400 proceeds to operation 408, where the MA 234, 234' compares a current value of the counter to a last stored value of the counter. The operation 408 can be repeated N number of times (where N is configurable).

From operation 408, the method 400 proceeds to operation 410, shown in FIG. 4B. At operation 410, the MA 234, 234' determines whether a counter change has occurred. If so, the method proceeds to operation 412, where the method 400 ends. If no change has occurred, the method 400 proceeds to operation 414, where the MA 234, 234' issues a command to purge the ARP cache 238. In response, the ARP cache 238 is purged.

From operation 414, the method 400 proceeds to operation 416, where the MA 234, 234' generates one or more ARP requests, such as the ARP request(s) 242, and sends the ARP request(s) 242 to the customer VLAN elements 210. From operation 416, the method 400 proceeds to operation 418, where the MA 234, 234' waits for one or more ARP response message(s), such as the ARP response(s) 244, from one or more of the customer VLAN elements 210. From operation 418, the method 400 proceeds to operation 420, where the MA 234, 234' determines whether one or more of the ARP responses 244 have been received (i.e., entries added to the ARP cache 238). If so, the method 400 proceeds to operation 412, where the method 400 ends. If, at operation 420, the method 400 determines that one or more of the ARP responses 244 have not been received, the method 400 proceeds to operation 422, where the MA 234, 234' generates a notification directed to the FMS 206 and sends the notification to the FMS 206 to notify the FMS 206 that VLAN connectivity has been lost. From operation 422, the method 400 proceeds to operation 412, where the method 400 ends.

Figure 5:
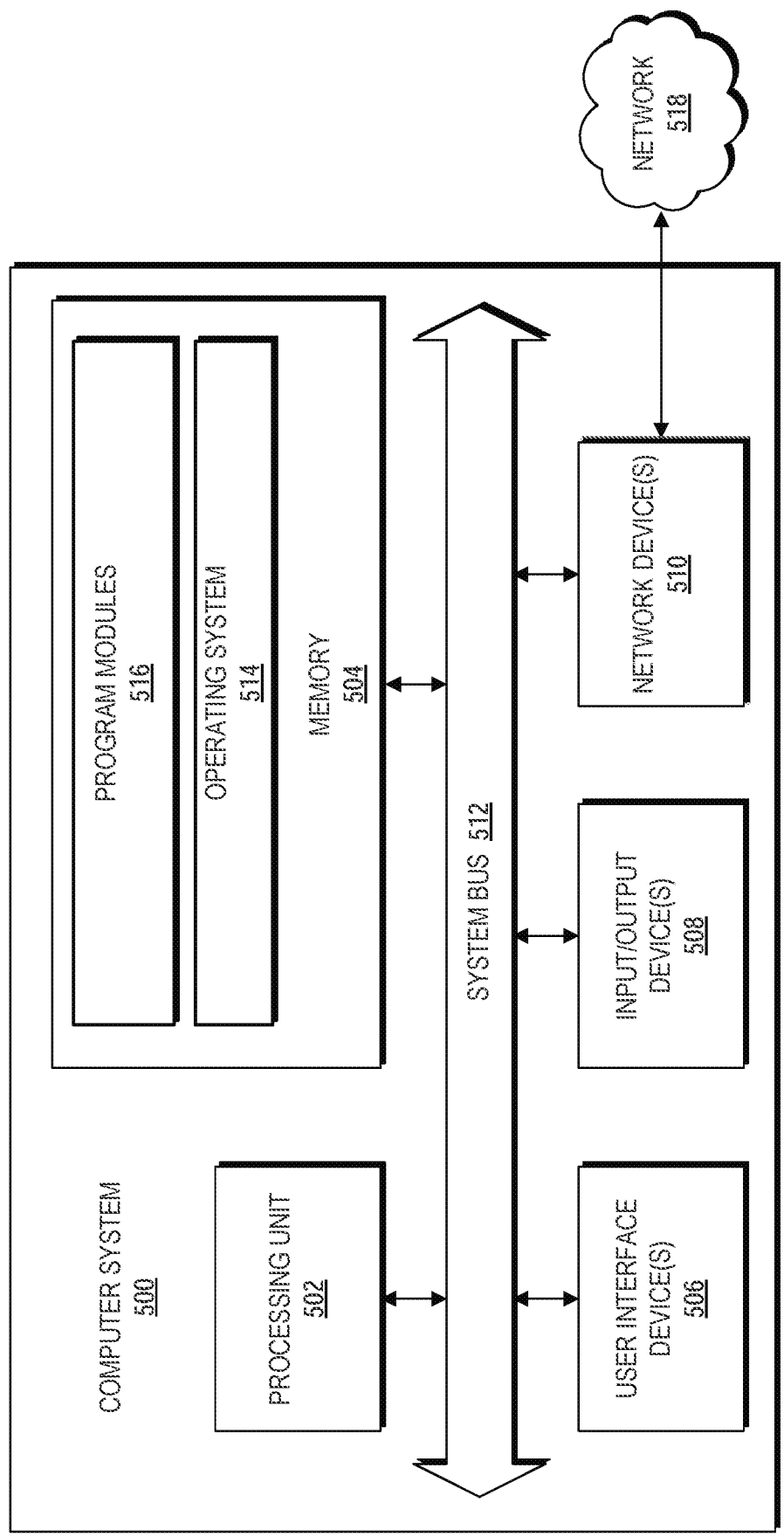
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some implementations, the hardware resource layer 220 (illustrated in FIG. 2) includes one or more computers that are configured like the architecture of the computer system 500. The computer system 500 may provide at least a portion of the compute resources 226, the memory resources 228, and/or the other resources 230. The FMS 206 can be configured like the architecture of the computer system 500. One or more of the customer VLAN elements 210 can be configured like the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 226 (illustrated in FIG. 2) can include one or more processing units 502.

The memory 504 communicates with the processing unit 502 via the system bus 512. In some embodiments, the memory 504 is operatively connected to a memory controller (not shown) that enables communication with the processing unit 502 via the system bus 512. The memory resources 228 can include one or more instances of the memory 504. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like. The memory 504 also can store the ARP cache 238 and entry lists generated by the MA 234, 234'.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof. The program modules 516 can include the MA 234, 234'.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518. Examples of the network devices 510 include, but are not limited to, a modem, a radio frequency ("RF") or infrared ("IR") transceiver, a telephonic interface, a bridge, a router, or a network card. The network 518 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be or may include a wired network such as, but not limited to, a Wide Area Network ("WAN"), a wired Personal Area Network ("PAN"), or a wired Metropolitan Area Network ("MAN"). The network 518 may be or may include the SDN network 208.

Based on the foregoing, it should be appreciated that concepts and technologies directed to low-impact proactive monitoring of customer access to virtualized network elements in a cloud platform have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A system comprising:
    an interface to a managed virtual network function, wherein the managed virtual network function is part of a virtual local area network along with a plurality of virtual local area network elements of a customer premises portion of the virtual local area network;
    a processor; and
    a memory that stores instructions of a managing agent that, when executed by the processor, cause the processor to perform operations comprising
        generating an address resolution protocol request,
        sending the address resolution protocol request to the plurality of virtual local area network elements of the customer premises portion of the virtual local area network,
        waiting for an address resolution protocol response from at least one of the plurality of virtual local area network elements of the customer premises portion of the virtual local area network,
        determining whether an address resolution protocol response has been received from at least one of the plurality of virtual local area network elements of the customer premises portion of the virtual local area network, and
        in response to determining that an address resolution protocol response has not been received from any of the plurality of virtual local area network elements of the customer premises portion of the virtual local area network,
            determining that connectivity between the managed virtual network function of the virtual local area network and the plurality of virtual local area network elements of the customer premises portion of the virtual local area network has been lost, wherein determining that connectivity between the managed virtual network function of the virtual local area network and the plurality of virtual local area network elements of the customer premises portion of the virtual local area network has been lost is performed without installation, on any of the plurality of virtual local area network elements of the customer premises portion of the virtual local area network, of any software associated with determining whether connectivity has been lost, and
            generating a notification that connectivity between the managed virtual network function of the virtual local area network and the plurality of virtual local area network elements of the customer premises portion of the virtual local area network has been lost.

2. The system of claim 1, wherein generating the address resolution protocol request is performed in response to determining that no entry associated with any of the plurality of virtual local area network elements of the customer premises portion of the virtual local area network was found in an address resolution protocol cache of the managed virtual network function after a number of checks of the address resolution protocol cache.

3. The system of claim 2, wherein a time between checks of the address resolution protocol cache is configurable.

4. The system of claim 1, wherein the interface comprises a command line interface.

5. The system of claim 1, wherein the interface comprises an IP management information base.

6. The system of claim 1, wherein the interface comprises a proprietary management information base.

7. The system of claim 1, wherein the notification comprises a network configuration protocol notification or a simple network management protocol notification.

8. A computer-readable storage medium storing instructions that, when executed by a processor of a system, cause the processor to perform operations comprising:
    generating an address resolution protocol request;
    sending the address resolution protocol request to a plurality of virtual local area network elements of a customer premises portion of a virtual local area network, wherein a managed virtual network function is also part of the virtual local area network;
    waiting for an address resolution protocol response from at least one of the plurality of virtual local area network elements of the customer premises portion of the virtual local area network;
    determining whether an address resolution protocol response has been received from at least one of the plurality of virtual local area network elements of the customer premises portion of the virtual local area network; and
    in response to determining that an address resolution protocol response has not been received from any of the plurality of virtual local area network elements of the customer premises portion of the virtual local area network,
        determining that connectivity between the managed virtual network function of the virtual local area network and the plurality of virtual local area network elements of the customer premises portion of the virtual local area network has been lost, wherein determining that connectivity between the managed virtual network function of the virtual local area network and the plurality of virtual local area network elements of the customer premises portion of the virtual local area network has been lost is performed without installation, on any of the plurality of virtual local area network elements of the customer premises portion of the virtual local area network, of any software associated with determining whether connectivity has been lost, and
        generating a notification that connectivity between the managed virtual network function of the virtual local area network and the plurality of virtual local area network elements of the customer premises portion of the virtual local area network has been lost.

9. The computer-readable storage medium of claim 8, wherein generating the address resolution protocol request is performed in response to determining that no entry associated with any of the plurality of virtual local area network elements of the customer premises portion of the virtual local area network was found in an address resolution protocol cache of the managed virtual network function after a number of checks of the address resolution protocol cache.

10. The computer-readable storage medium of claim 9, wherein a time between checks of the address resolution protocol cache is configurable.

11. The computer-readable storage medium of claim 8, wherein an interface of the system comprises a command line interface.

12. The computer-readable storage medium of claim 8, wherein an interface of the system comprises an IP management information base.

13. The computer-readable storage medium of claim 8, wherein an interface of the system comprises a proprietary management information base.

14. The computer-readable storage medium of claim 8, wherein the notification comprises a network configuration protocol notification or a simple network management protocol notification.

15. A method comprising:
generating, by a fault management system comprising a processor, an address resolution protocol request;
sending, by the fault management system, the address resolution protocol request to a plurality of virtual local area network elements of a customer premises portion of a virtual local area network, wherein a managed virtual network function is also part of the virtual local area network;
waiting, by the fault management system, for an address resolution protocol response from at least one of the plurality of virtual local area network elements of the customer premises portion of the virtual local area network;
determining, by the fault management system, whether an address resolution protocol response has been received from at least one of the plurality of virtual local area network elements of the customer premises portion of the virtual local area network; and
in response to determining that an address resolution protocol response has not been received from any of the plurality of virtual local area network elements of the customer premises portion of the virtual local area network,
determining, by the fault management system, that connectivity between the managed virtual network function of the virtual local area network and the plurality of virtual local area network elements of the customer premises portion of the virtual local area network has been lost, wherein determining that connectivity between the managed virtual network function of the virtual local area network and the plurality of virtual local area network elements of the customer premises portion of the virtual local area network has been lost is performed without installation, on any of the plurality of virtual local area network elements of the customer premises portion of the virtual local area network, of any software associated with determining whether connectivity has been lost, and
generating, by the fault management system, a notification that connectivity between the managed virtual network function of the virtual local area network and the plurality of virtual local area network elements of the customer premises portion of the virtual local area network has been lost.

16. The method of claim 15, wherein generating the address resolution protocol request is performed in response to determining that no entry associated with any of the plurality of virtual local area network elements of the customer premises portion of the virtual local area network was found in an address resolution protocol cache of the managed virtual network function after a number of checks of the address resolution protocol cache.

17. The method of claim 16, wherein a time between checks of the address resolution protocol cache is configurable.

18. The method of claim 15, wherein an interface of the fault management system comprises a command line interface.

19. The method of claim 15, wherein an interface of the fault management system comprises an IP management information base or a proprietary management information base.

20. The method of claim 15, wherein the notification comprises a network configuration protocol notification or a simple network management protocol notification.

* * * * *